US011104397B2

United States Patent
Kawai et al.

(10) Patent No.: US 11,104,397 B2
(45) Date of Patent: Aug. 31, 2021

(54) INFORMATION TRANSMISSION METHOD IMPLEMENTED IN VEHICLE AND INFORMATION TRANSMISSION SYSTEM FOR MOTORCYCLE

(71) Applicant: KAWASAKI JUKOGYO KABUSHIKI KAISHA, Kobe (JP)

(72) Inventors: Daisuke Kawai, Kobe (JP); Masanori Kinuhata, Kobe (JP); Hiroshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/979,040

(22) PCT Filed: Jan. 21, 2019

(86) PCT No.: PCT/JP2019/001707

§ 371 (c)(1),
(2) Date: Sep. 8, 2020

(87) PCT Pub. No.: WO2019/171792

PCT Pub. Date: Sep. 12, 2019

(65) Prior Publication Data

US 2021/0053639 A1 Feb. 25, 2021

(30) Foreign Application Priority Data

Mar. 9, 2018 (JP) ............................ JP2018-042810

(51) Int. Cl.

| | |
|---|---|
| ***B62J 6/22*** | (2020.01) |
| ***B60W 50/14*** | (2020.01) |
| ***B62J 3/00*** | (2020.01) |

(52) U.S. Cl.

CPC ................ *B62J 6/22* (2020.02); *B60W 50/14* (2013.01); *B62J 3/00* (2013.01); *B60W 2050/146* (2013.01)

(58) Field of Classification Search

None

See application file for complete search history.

(56) References Cited

U.S. PATENT DOCUMENTS

| | | | | |
|---|---|---|---|---|
| 4,768,086 A * | 8/1988 | Paist | ...................... | A63J 17/00 340/815.46 |
| 5,784,096 A * | 7/1998 | Paist | ...................... | A63J 17/00 348/32 |
| 7,916,039 B2 * | 3/2011 | Hess | ...................... | H04S 7/302 340/691.1 |
| 8,942,878 B2 * | 1/2015 | Schuessler | ........... | B60W 50/14 701/22 |
| 9,372,344 B2 * | 6/2016 | Ting | ...................... | G02B 27/01 |

(Continued)

FOREIGN PATENT DOCUMENTS

| | | |
|---|---|---|
| JP | 2004104684 A | 4/2004 |
| JP | 2016043773 A | 4/2016 |

*Primary Examiner* — Chico A Foxx

(74) *Attorney, Agent, or Firm* — Alleman Hall Creasman & Tuttle LLP

(57) ABSTRACT

Provided is an information transmission method including: a type determination step of determining a type of information to be transmitted to a driver of a vehicle when the driver is driving the vehicle; a sound output step of outputting the information in the form of sound; and a display step of operating a display device to display an illumination pattern as a function of the determined type.

9 Claims, 4 Drawing Sheets

(56) References Cited

U.S. PATENT DOCUMENTS 10,682,953 B1 * 6/2020 Mills .................... B60K 35/00
2003/0142422 A1 * 7/2003 Spitzer .................... B62J 99/00
359/842
2006/0028330 A1 * 2/2006 Gallant .................. B60K 35/00
340/441
2007/0262883 A1 * 11/2007 Kumabe .......... G08G 1/096716
340/936
2008/0036577 A1 * 2/2008 Natsume ............... B60W 50/14
340/425.5
2008/0157952 A1 * 7/2008 Gallant .................... G01P 1/08
340/441
2012/0200427 A1 * 8/2012 Kamata .................. B60Q 9/008
340/901
2012/0312609 A1 * 12/2012 Takewaka ................ B62J 17/02
180/65.1
2013/0057397 A1 * 3/2013 Cutler ................ B62D 15/0255
340/435
2013/0260835 A1 * 10/2013 Sikora .................... H05B 45/00
455/566
2014/0195088 A1 * 7/2014 Schuessler ............. B60Q 5/005
701/22
2015/0154940 A1 * 6/2015 Weaver ................... G06F 3/147
345/156
2018/0015878 A1 * 1/2018 McNew ................. B60Q 9/008
2019/0009773 A1 * 1/2019 Miyahara ............... H04N 7/183
2019/0265712 A1 * 8/2019 Satzoda ................ B60W 40/09

* cited by examiner

INFORMATION TRANSMISSION METHOD IMPLEMENTED IN VEHICLE AND INFORMATION TRANSMISSION SYSTEM FOR MOTORCYCLE

TECHNICAL FIELD

The present invention relates to a method of transmitting information to a driver of a vehicle and also relates to a system used in a motorcycle to transmit information.

BACKGROUND ART

There have been proposed technologies for allowing a driver driving a motorcycle to exchange travel-related information with an information input/output device mounted on the vehicle or carried by the driver (see Patent Literature 1, for example). In Patent Literature 1, information on the situation behind the vehicle, route navigation information, and information on the states of the roads in the vicinity of the vehicle are output to a speaker embedded in a helmet.

CITATION LIST

Patent Literature

PTL 1: Japanese Laid-Open Patent Application Publication No. 2004-104684

SUMMARY OF INVENTION

Technical Problem

A driver of a vehicle focuses attention on the driving operation. In order that the driver may make smooth information exchange, it is desired to allow the driver to easily understand information transmitted from the vehicle.

It is therefore an object of the present invention to allow a driver of a vehicle to easily understand information transmitted from the vehicle.

Solution to Problem

An information transmission method for use in vehicles according to an aspect of the present invention is a method implemented in a vehicle to transmit information to a driver of the vehicle, the vehicle being equipped with a display device disposed to be viewable by the driver assuming a driving posture, the method including: determining a type of the information to be transmitted to the driver when the driver is driving the vehicle; outputting the information in the form of sound; and operating the display device to display an illumination pattern as a function of the determined type.

An information transmission system for a motorcycle according to an aspect of the present invention includes: a sound output device that outputs sounds; a display device mounted on a body of the motorcycle and disposed to be viewable by a driver assuming a driving posture; and a control device that controls the sound output device and the display device, the control device being configured to: determine a type of information to be transmitted to the driver when the driver is driving the motorcycle; and operate the sound output device to output the information to be transmitted; operate the display device to display an illumination pattern as a function of the determined type.

In the above configuration, the driver can recognize the to-be-received information not only through the auditory sense but through the visual sense. Thus, the driver can easily understand the information.

Advantageous Effects of Invention

The present invention allows a driver of a vehicle to easily understand information transmitted from the vehicle.

DESCRIPTION OF EMBODIMENTS

Hereinafter, exemplary embodiments will be described with reference to the drawings. The same or like elements are denoted by the same reference signs throughout the drawings, and detailed descriptions of these elements will be given once and not repeated.

Figure 1:
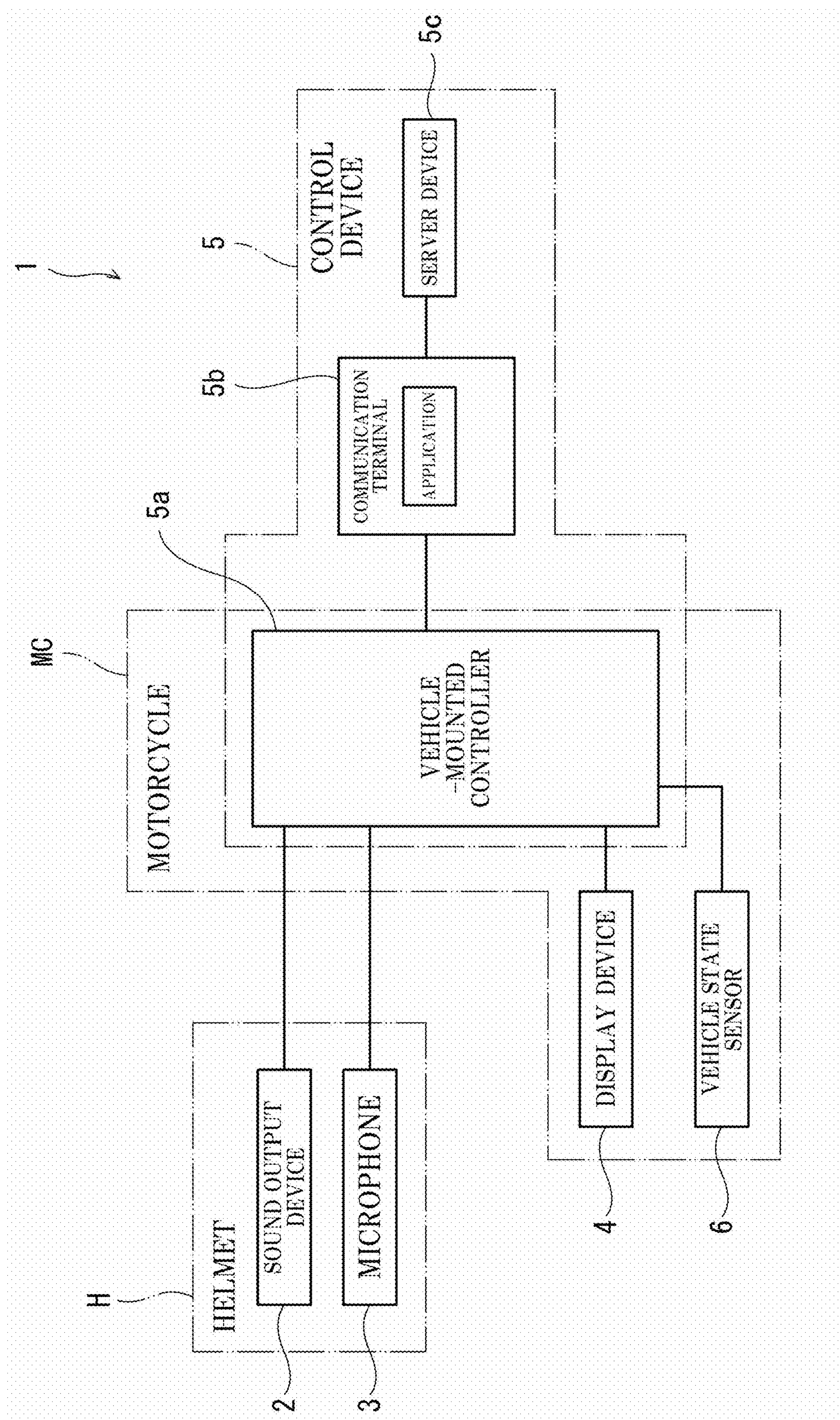
FIG. 1 is a configuration diagram of an information transmission system used in a motorcycle presented as an example of the vehicle.

Referring to FIG. 1, an information transmission system 1 of an exemplary embodiment includes a sound output device 2, a microphone 3, a display device 4, and a control device 5. In this embodiment, the information transmission system 1 is adapted for use in a vehicle, in particular a motorcycle MC which is a straddle vehicle. The sound output device 2 receives an electric signal (this electric signal will hereinafter be referred to as "device-generated information") from the control device 5, outputs the signal in the form of sound, and thereby auditorily transmits information to the driver. The "sound" output from the sound output device 2 includes voices expressed as linguistic information and may further include sound effects. The microphone 3 collects a voice emitted from the driver, converts the collected voice to an electric signal (this electric signal will hereinafter be referred to as "driver utterance information"), and provides the resulting electric signal to the control device 5. The sound output device 2 and the microphone 3 are electrically connected to the control device 5.

For example, the sound output device 2 and the microphone 3 are embedded in a helmet H worn by the driver. In this case, the sound output device 2 and the microphone 3 are wirelessly connected to the control device 5. The sound output device 2 is embodied, for example, by a bone conduction speaker. In this case, the sound output device 2 includes a vibrator that vibrates according to a sound output to be provided, and this vibrator is placed in contact with a part of the body of the driver. Thus, the sound output device 2 transmits the device-generated information directly to the auditory nerves of the driver. The sound output device 2 and the microphone 3 may be embodied by any other existing technology.

The display device 4 visually transmits information to the driver. The display device 4 is controlled by the control device 5 to display different illumination patterns depending on the information to be transmitted. Since information transmission is performed based on the illumination patterns, the driver can more intuitively recognize the transmitted information than when the driver has to view and interpret textual information.

The parameters defining the illumination patterns include color, brightness, geometry (type and size of a graphic), and motion (change over time). Various illumination patterns can be created by using different combinations of the parameters, and a change in at least one of the parameters provides a different illumination pattern. Examples of the illumination patterns that can be created include a pattern consisting of a small, dark red circle whose diameter alternately increases and decreases and a pattern consisting of a bright blue blinking object in the shape of a straight line. The illumination patterns are not information represented by written words but are non-linguistic information or graphic information (which may be dynamic or static). The information displayed by the display device 4 is information which has no direct influence on the driving operation unlike information displayed by an instrument (meter) unit 11 (see FIG. 2) or which has less influence on the driving operation than the information displayed by the instrument unit 11. It is preferable that the "motion" (or "change over time"), which is one of the parameters defining the illumination patterns, or a change in illumination pattern which occurs upon a change in the information to be transmitted, be intuitively or sensorily recognizable by the driver.

The illumination patterns are preferably recognizable by the driver looking directly at the travel road. The human visual field is divided into a good-sight zone where objects are viewed by the central vision having a high acuity and a poor-sight zone where objects are viewed by the eccentric vision having a lower acuity than the central vision. The display device 4 is disposed in such a manner as to lie at least within the poor-sight zone of the visual field of the driver having the eyes directed toward the travel road or the instrument unit 11. The illumination patterns (or their parameters, in particular "brightness") and the illumination region (the region in which the illumination patterns are displayed) are adapted such that the driver can recognize the illumination region and the illumination patterns when they are located in the poor-sight zone of the driver. For example, the illumination region is formed as a region having a larger area than a display region assigned to the smallest of characters arranged on the instrument unit 11. The illumination region is preferably formed as a region having a larger area than a display region assigned to the largest of the characters arranged on the instrument unit 11. Thus, even when the display device 4 lies in the poor-sight zone (such as when the driver is concentrating on the driving operation with the eyes directed toward the travel road), the driver can instantaneously understand the displayed contents (what kind of illumination pattern is displayed and what is indicated by the transmitted information).

Since the illumination patterns are presented as non-linguistic information, the driver can more intuitively or sensorily recognize the transmitted information than when linguistic information is displayed and the driver has to read the words to understand the meaning of the linguistic information. Even when the illumination region lies outside the good-sight zone of the visual field of the driver, the transmitted information can more easily be recognized than linguistic information.

In the present embodiment, the display device 4 includes a light-emitting section composed of point light sources or surface light sources. The display device 4 is capable of displaying a plurality of illumination patterns to increase the variety of information to be recognized by the driver. As previously mentioned, each illumination pattern is defined by color, brightness, geometry, and motion (change over time), and a change in at least one of these parameters provides a different illumination pattern. This can eliminate the undesirable need for increasing the number of illumination regions to enable transmission of a variety of information. For example, it is desirable for the light-emitting section to be able to vary the color and amount of emitted light and the period at which the light emission occurs. Specific examples of the light sources of the light-emitting section include, but are not necessarily limited to, light emitting diodes (LEDs) and organic electroluminescent (EL) elements.

The display device 4 is mounted on the vehicle body of the motorcycle MC. In particular, the display device 4 is disposed at a location such that the driver assuming a driving posture can visually recognize the illumination patterns. The display device 4 is connected to and controlled by the control device 5. In particular, the display device 4 changes the illumination pattern to be displayed in accordance with an illumination command provided from the control device 5.

The control device 5 is connected to a vehicle state sensor 6 mounted on the vehicle to detect the vehicle state. In the present embodiment, the control device 5 is a vehicle-mounted controller 5*a*. For example, a meter control device that controls the displayed contents of the instrument unit 11 is used as the vehicle-mounted controller 5*a*.

The vehicle-mounted controller 5*a* recognizes the driver utterance information by receiving an electric signal from the microphone 3. Based on the driver utterance information, the vehicle-mounted controller 5*a* generates the device-generated information as information to be transmitted in response to the driver's utterance. The vehicle-mounted controller 5*a* receives information representing the vehicle state from the vehicle state sensor 6, and generates the device-generated information such that the information to be transmitted matches the situation.

The vehicle-mounted controller 5*a* generates an electric signal representative of the information to be transmitted to the driver. The vehicle-mounted controller 5*a* provides the generated electric signal to the sound output device 3 and the display device 4 which are output devices. The output devices give outputs corresponding to the electric signal provided from the vehicle-mounted controller 5*a*. In particular, the sound output device 2 outputs a sound, and the display device 4 outputs an illumination pattern. The driver can understand the meaning of the transmitted information by recognizing the information output by the output devices.

In the present embodiment, the vehicle-mounted controller 5*a* is communicatively connected to an external server device 5*c* via a communication terminal device 5*b* (smartphone or tablet) carried by the driver. In the present embodiment, the vehicle-mounted controller 5*a* is configured to communicate with the external server device 5*c* via the communication terminal device 5*b* (smartphone or tablet) carried by the driver. In this case, the communicative connection between the communication terminal device 5*b* and the vehicle-mounted controller 5*a* can be established by a wireless communication protocol such as Bluetooth (registered trademark) or wireless LAN. The communicative connection between the communication terminal device 5*b* and the server device 5*c* can be established thorough a communication link provided by a telecommunications carrier.

The vehicle-mounted controller 5*a* receives information from the microphone 3 and the vehicle state sensor 6 and provides the received information to the server device 5*c* through the communication terminal device 5*b*. In this case, the server device 5*c* may generate information to be transmitted to the driver based on the provided information. The server device 5*c* sends the generated information to the vehicle-mounted controller 5*a* through the communication terminal device 5*b*. Based on the information provided from the server device 5*c*, the vehicle-mounted controller 5*a* generates an electric signal representative of the information to be transmitted to the driver. The vehicle-mounted controller 5*a* provides the generated electric signal to the sound output device 2 and the display device 4 which are output devices. Alternatively, the communication terminal device 5*b* may, instead of the server device 5*c*, generate information to be transmitted to the driver. Thus, the entity which generates the information to be transmitted to the driver is not limited to the vehicle-mounted controller 5*a*, and the server device 5*c* or the communication terminal device 5*b* may generate the information. That is, it is sufficient for the control device 5 to generate the information to be transmitted to the driver. The control device 5 may be considered as an entity including the vehicle-mounted controller 5*a*, the server device 5*c*, and the communication terminal device 5*b*.

When the communication terminal device 5*b* is used, it is desirable that a specialized application program be installed in the communication terminal device 5*b* and that information identifying the driver and vehicle be managed by the application program. The application program to be installed in the communication terminal device 5*b* is available, for example, from a provider of the vehicle. Before starting to drive the vehicle, the driver may install the application program in the driver's own communication terminal device 5*b* and execute the installed program to input information (such as information identifying the driver and information identifying the motorcycle owned by the driver) needed to implement the information transmission system. The information input to the communication terminal device 5*b* may be stored and managed in the server device 5*c*.

The motorcycle MC may include an on/off switch disposed in the vicinity of the instrument unit 11 and handlebars 12L and 12R to enable and disable wireless communication connection. The on/off switch is operated by the driver. The inclusion of this switch allows the driver to enable and disable connection to the server device 5*c* or the communication terminal device 5*b* depending on the driver's preference or the situation, thus improving the user-friendliness of the motorcycle MC. The motorcycle MC may include a command switch disposed in the vicinity of the instrument unit 11 and handlebars 12L and 12R to input commands to activate and deactivate the information transmission system and other commands. The inclusion of this switch allows the driver to provide commands by means other than voices, thus improving the user-friendliness of the motorcycle MC.

Figure 2:
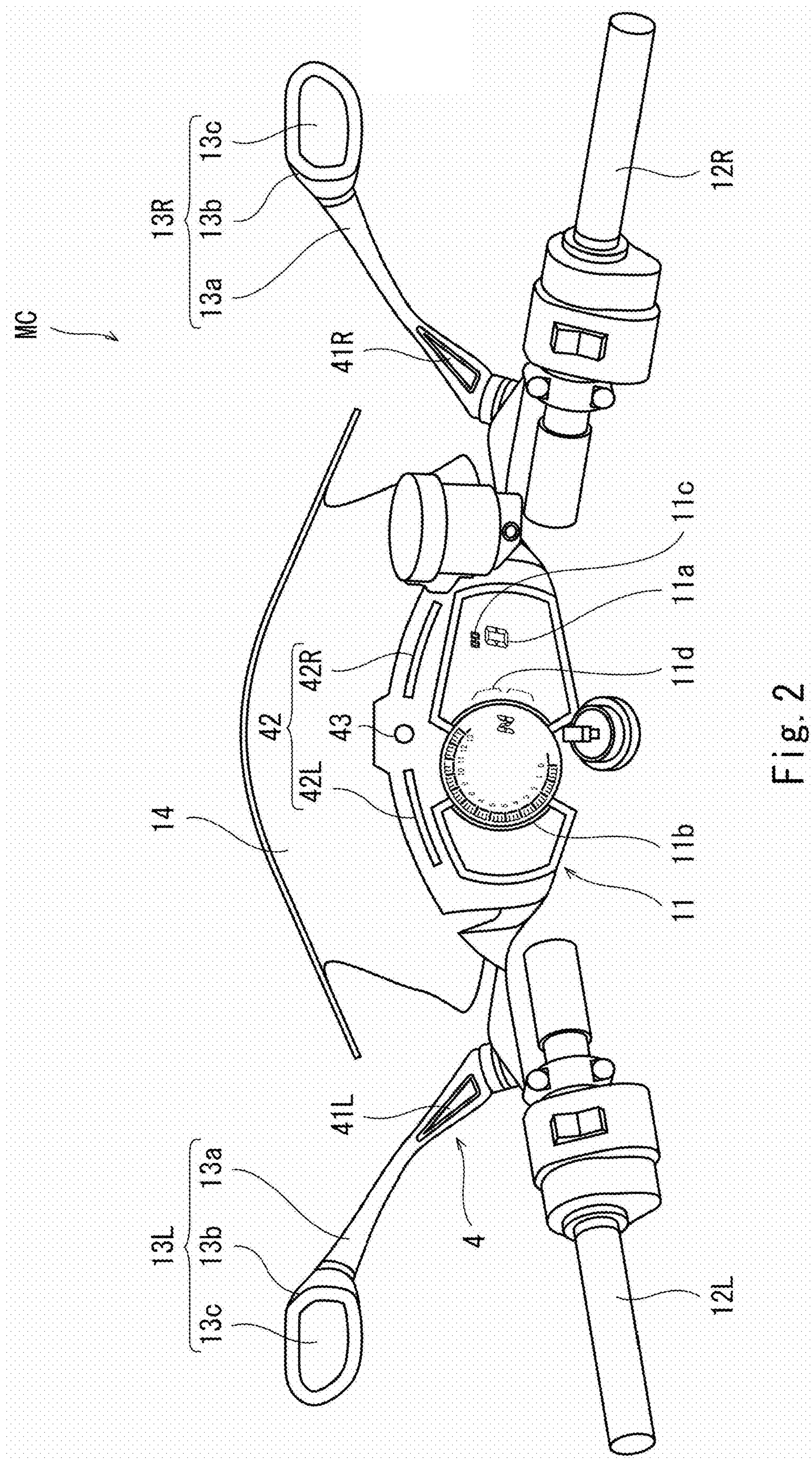
FIG. 2 shows an example of the display device.

FIG. 2 shows an example of the display device 4. The motorcycle MC includes the instrument unit 11 located at its center in the vehicle width direction. The instrument unit 11 includes a plurality of meters such as a speed meter 11*a*, a rotational speed meter 11*b*, a travel distance meter 11*c*, and a fuel meter 11*d*, and these meters are closely arranged to constitute the unit.

The motorcycle MC includes a pair of left and right handlebars 12L and 12R as a steering device. The handlebars 12L and 12R are pivotally operated by the driver gripping the handlebars 12L and 12R. In the present embodiment, the handlebars 12L and 12R are located outward of the instrument unit 11 in the vehicle width direction. The motorcycle MC includes a pair of left and right side mirrors 13L and 13R serving as rearview mirrors for allowing the driver to know the state of the rearward surroundings located outward of the vehicle in the vehicle width direction. The side mirrors 13L and 13R are located outward of the instrument unit 11 in the vehicle width direction and above the handlebars 12L and 12R. Each of the side mirrors 13L and 13R includes a mirror stay 13*a* extending generally upward from the vehicle body, a mirror housing 13*b* attached to the upper end of the mirror stay 13*a*, and a mirror 13*c* enclosed in the mirror housing 13*b* and having a mirror surface facing rearward.

When driving the vehicle, the driver holds the handlebars 12L and 12R with the eyes directed forward of the vehicle, and checks the rearward surroundings with the aid of the side mirrors 13L and 13R while checking the state of the vehicle with the aid of the instrument unit 11. The instrument unit 11 and the side mirrors 13L and 13R are disposed to be easily viewable by the driver assuming a driving posture. The motorcycle MC of the present embodiment includes a windshield 14 as a wind blocking member for reducing the wind pressure imposed on the driver during travel. The windshield 14 is embodied by a transparent plate material. The windshield 14 extends generally upward from the vehicle body and covers the instrument unit 11 from the front.

The display device 4 includes side light units 41L and 41R located outward of the instrument unit 11 in the vehicle width direction. The side light units 41L and 41R are an example of the light-emitting section as described above. Each of the side light units 41L and 41R is, for example, a light source device composed of a plurality of LEDs arranged in a matrix or in a line. Each LED is, for example, an RGB full-collar LED. The side light units 41L and 41R are paired left and right units, and are arranged symmetrically with respect to the centerline of the vehicle width. In the present embodiment, the side light units 41L and 41R are mounted on the mirror stays 13*a* of the side mirrors 13L and 13R, respectively. Specifically, each of the side light units 41L and 41R is mounted on the rear surface of the mirror stay 13*a* so that the light emitting surface of the side light unit faces the driver. Each of the side light units 41L and 41R is shaped to extend longitudinally in the up-down direction. The mirror stays 13*a* extend upward while being inclined outward in the vehicle width direction. Accordingly, the side light units 41L and 41R also extend in the up-down direction with an inclination toward the outside in the vehicle width direction. It is sufficient that each of the side light units 41L and 41R be arranged to present a strip shape extending longitudinally in the up-down direction. In another example, the side light units 41L and 41R may be mounted on the two side edges of the windshield in the vehicle width direction. If a windshield stay for supporting the windshield is provided to extend in the up-down direction, the side light units 41L and 41R may be mounted on the windshield stay.

The display device 4 according to the present embodiment includes front light units 42L and 42R located above the display portion of the instrument unit 11. The front light units 42L and 42R are also light source devices each composed of a plurality of LEDs arranged in a matrix or in a line. Each LED is, for example, an RGB full-collar LED. The front light units 42L and 42R are located inward of the pair of mirror stays 13*a* in the vehicle width direction and inward of the pair of side edges of the windshield in the vehicle width direction. The front light units 42L and 42R are shaped to extend longitudinally in the vehicle width direction and are arranged along the upper edge of the instrument unit 11. In the present embodiment, the front light units 42L and 42R are also paired left and right units and arranged symmetrically with respect to the centerline of the vehicle width. It is sufficient that each of the front light units 42L and 42R be arranged to present a strip shape extending longitudinally in the vehicle width direction. In another example, the front light units 42L and 42R may be disposed at the rear edge of the windshield or below the display portion of the instrument unit 11. For instance, the front light units 42L and 42R may be arranged along the lower edge of the instrument unit 11. The front light units 42L and 42R may be mounted on an upper bracket or a handle post.

The use of the light units 41L, 41R, 42L, and 42R of strip shape can broaden the illumination region. This makes it easy to enhance the viewability of a change in illumination pattern. Additionally, since one of different illumination patterns is selectively displayed, the transmitted information can be better understood, albeit smaller in information volume, than information transmitted in the form of symbols or words.

Each of the side light units 41L and 41R can be operated to present a predetermined dynamic illumination pattern. An example of the dynamic illumination pattern is a meteor-like pattern displayed on the inner surface of the mirror stay by turning on and off the LEDs in order from the upper outermost LED to the lower innermost LED or in the reverse order. Hereinafter, an illumination pattern displayed by turning on and off the LEDs in order from the upper outermost LED to the lower innermost LED will be referred to as “inwardly-moving meteor type”, while an illumination pattern displayed by turning on and off the LEDs in order from the lower innermost LED to the upper outermost LED will be referred to as “outwardly-moving meteor type”. Another example of the dynamic illumination pattern is a pattern displayed by performing, at least one time, a series of operations consisting of simultaneous turning on of all of the LEDs and simultaneous turning off of all of the LEDs (this pattern will hereinafter be referred to as “collective blinking type”). The side light units 41L and 41R are paired left and right units. When an illumination pattern of either of the meteor types is used, the side light units 41L and 41R are controlled such that the turned-on LEDs of the left and right units 41L and 41R are at symmetrical locations. When an illumination pattern of the collective blinking type is used, the side light units 41L and 41R are controlled such that the LEDs of the left unit 41L are turned on and off at the same time as the LEDs of the right unit 41R. Turning on and off of the front light units 42L and 42R may also be controlled to present dynamic illumination patterns similar to those described above.

Figure 4:
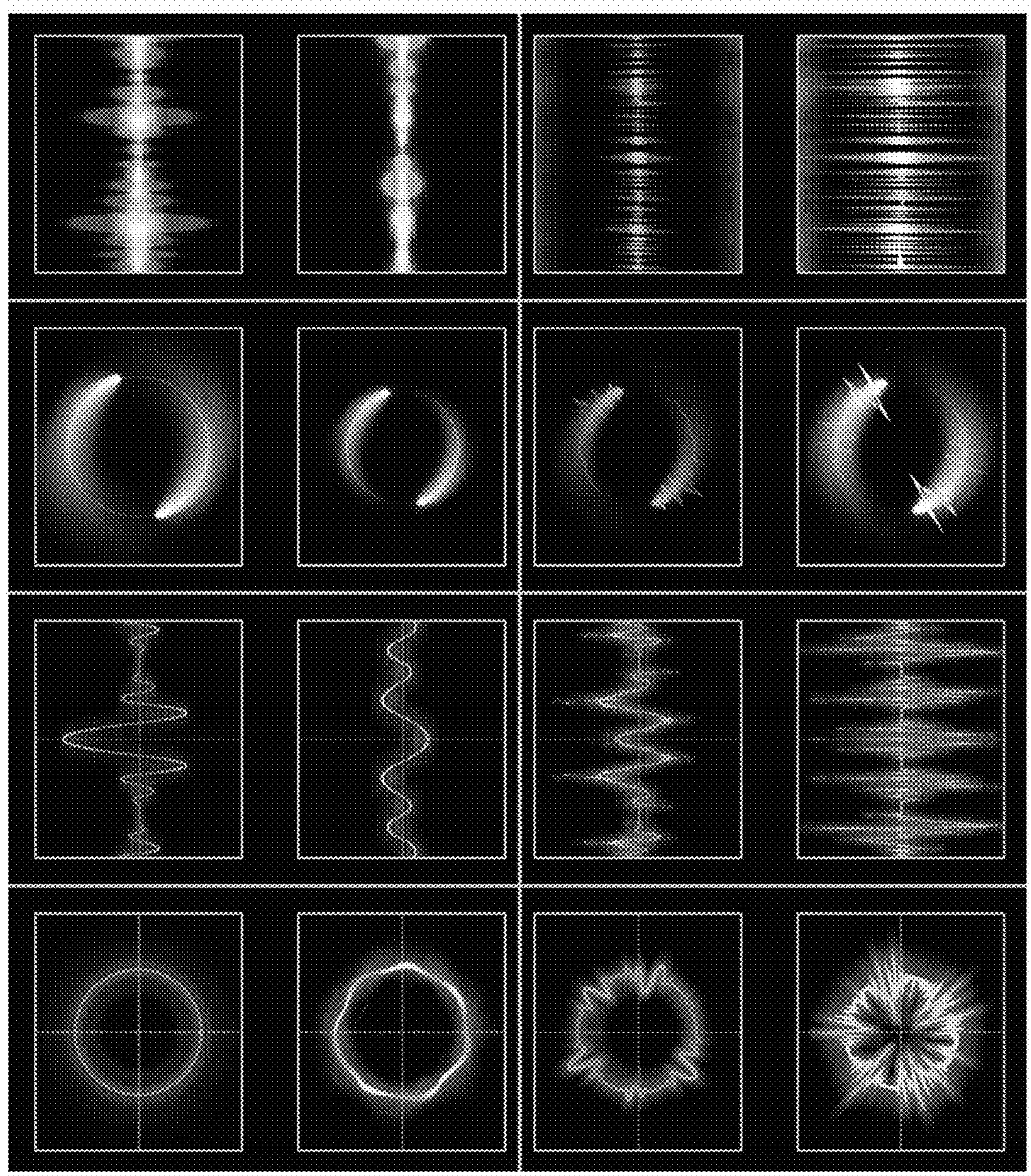
FIG. 4 shows examples of illumination patterns displayed by a center light unit.

The display device 4 according to the present embodiment includes a center light unit 43 located on the centerline of the vehicle width. The center light unit 43 is configured to display graphics. The center light unit 43 can vary the graphic to be displayed depending on the information to be transmitted, thereby displaying different illumination patterns. In the present embodiment, the center light unit 43 can display different illumination patterns by varying the manner of the motion of the displayed graphic depending on the information to be transmitted. The center light unit 43 includes a small-sized display portion capable of dynamically displaying various graphic patterns. In the present embodiment, the center light unit 43 is located between the pair of front light units 42L and 42R. FIG. 4 shows examples of the illumination patterns displayed by the center light unit 43. Examples of dynamic graphic patterns displayed by the center light unit 43 include a graphic pattern consisting of a generally circular graphic that exhibits a heartbeat-like motion by alternately increasing and decreasing its diameter at a constant period. For such a graphic pattern, the period at which the diameter changes, or the outer shape of the graphic, may be varied depending on the information to be transmitted.

The colors of illumination of the display device 4 (the light units 41L, 41R, 42L 42R, and 43) are set such that the impressions given by the colors match the contents of the information to be transmitted. For example, a red color may be used for transmission of warning information, and a green color may be used for transmission of mild information. In order to enable transmission of a wide variety of information, the display device 4 may be configured so that not only the hue of the illumination colors, but also the tone (lightness and saturation) of the illumination colors and the amount of emitted light can be freely set.

The control device 5 controls the sound output device 2 and the display device 4 to transmit appropriate information to the driver. Based on various input information, the control device 5 generates information to be output by the sound output device 2 and the display device 4. Examples of the input information include the driver utterance information output from the microphone 3. Other examples of the input information include vehicle state information representing the vehicle state detected by the vehicle state sensor 6. Examples of the vehicle state information include the vehicle speed, the vehicle acceleration, the rotational speed of the output shaft of the drive source, the output torque of the drive source, the coolant water temperature, and the operation amount of an accelerating operation member (e.g., an accelerator grip) operated by the driver. Further, the control device 5 may cause the display device 4 to output information representing a pseudo-emotion of the vehicle based on, for example, the vehicle state information. The information representing the pseudo-emotion of the vehicle may be vehicle emotion information representing “comfort” or “discomfort”, may be vehicle emotion information representing “delight”, “anger”, “sadness”, or “enjoyment”, may be vehicle emotion information representing “like” or “dislike”, or may be vehicle emotion information representing “repression” or “release”. Pseudo-emotions can be paraphrased as emotions which would arise in the motorcycle if it were a living creature. Examples of the pseudo-emotions include the feelings of “comfort” and “discomfort”. The entity which generates the pseudo-emotion information may be any of the vehicle-mounted controller 5*a*, the mobile information terminal 5*b*, and the server device 5*c*.

The information to be transmitted to the driver can be classified into several information types. After generating the information to be transmitted to the driver, the control device 5 operates the display device 4 to display an illumination pattern as a function of the type of the generated information.

The information types include “response status” associated with information generated in communication between the driver and the vehicle (control device 5). The communication with the driver may be communication in a “Q&A” form (in particular, a form in which the control device 5 gives answers to questions from the driver). In this case, the “response status” includes “standby status”, “utterance information acquiring status”, “analyzing status”, and “answering status”. The “standby status” is information indicating that the vehicle is kept in a standby state where questions from the driver are receivable. The “utterance information acquiring status” is information indicating that a question uttered by the driver is being acquired. The “analyzing status” is information indicating that a process intermediate between receiving the question from the driver and giving an answer to the question is being executed, namely that the acquired question is being analyzed. The "answering status" is information indicating that the answer to the driver's question is being given through the sound output device 2.

A good example of the Q&A communication between the driver and the vehicle is an exchange of questions and answers concerning navigation information. For example, when the driver wants to know the place of a nearby gas station and the distance to the gas station, the driver may ask the control device 5 about the place and distance through the microphone 3 after confirming that an illumination pattern representing the standby status is displayed and therefore that the current status is the "standby status".

Once the control device 5 understands the meaning of the question uttered by the driver, the control device 5 ends the standby status, proceeds to the analyzing status, and changes the displayed illumination pattern to a pattern representing the analyzing status. In the analyzing status, the control device 5 analyzes and interprets the contents of the utterance of the driver, and searches for and generates information for the answer based on the result of analysis and interpretation (in this example, information representing the place of a nearby gas station and the distance to the gas station is searched for and generated). When failing to recognize the contents of the utterance for a reason such as unclear pronunciation of the driver and failing to prepare or generate information for the answer to the driver's question, the control device 5 generates information for inducing the driver to utter the question again. In this case, for example, the displayed illumination pattern is changed to that representing the "standby status".

Once the above analyzing status is ended, namely once the information to be transmitted as the answer is generated, the control device 5 proceeds to the answering status and changes the displayed illumination pattern to one which represents the answering status. In the answering status, the control device 5 causes the sound output device 2 to transmit to the driver the information generated as the answer in the analyzing status.

The control device 5 is configured to output a first information type, and the "response status" described above is a typical example of the "first information type". The first information type, as broadly defined, is a type of information indicating the status of the control device 5 which is associated with driver-vehicle communication initiated by an utterance of the driver.

In the present embodiment, the control device is configured to output a second information type through the display device 4 in addition to the first information type. The second information type includes "event notification status" associated with information generated based on an event other than communication with the driver. In this case, the "event notification status" includes "pre-notification status" and "notifying status". The "pre-notification status" is information indicating a status where pre-notification is being provided which informs the driver that notification of an event will be provided because a condition for notification of the event has been satisfied. The "notifying status" is information indicating a status where the notification of the event is being provided through the sound output device. Examples of the event notification provided through the sound output device include nearby traffic information, weather information, route navigation information, vehicle state information, traffic information, and warning information such as information indicating that another vehicle is approaching. The nearby traffic information may include traffic jam information related to traffic jam on the roads around the current location of the vehicle. When the control device knows the destination of the driver, the nearby traffic information may include traffic jam information related to traffic jam on a candidate route to the destination. The route navigation information is information provided when the control device 6 knows the destination of the driver and the vehicle is approaching an intersection where the driver should make a right or left turn. Specifically, the route navigation information is information for informing the driver of the distance to the intersection and instructing the driver in which direction to make a turn at the intersection. The vehicle state information may include, for example, information indicating that the remaining amount of the fuel has decreased to a predetermined threshold and information indicating that the coolant water temperature or the lubricant oil temperature is outside a predetermined proper range.

As descried above, the first information type and the second information type include information output through cooperation with the sound output device 2. Another information type is a third information type which is output without cooperation with the sound output device 2. The third information type is information transmitted to the driver using only the display device 4 without sound output. Examples of this type of information include information representing pseudo-emotions of the vehicle.

The control device 5 is configured to operate the display device 4 to display an illumination pattern as a function of the type of the information to be transmitted. A specific example of this process will be described together with the control procedures.

Figure 3:
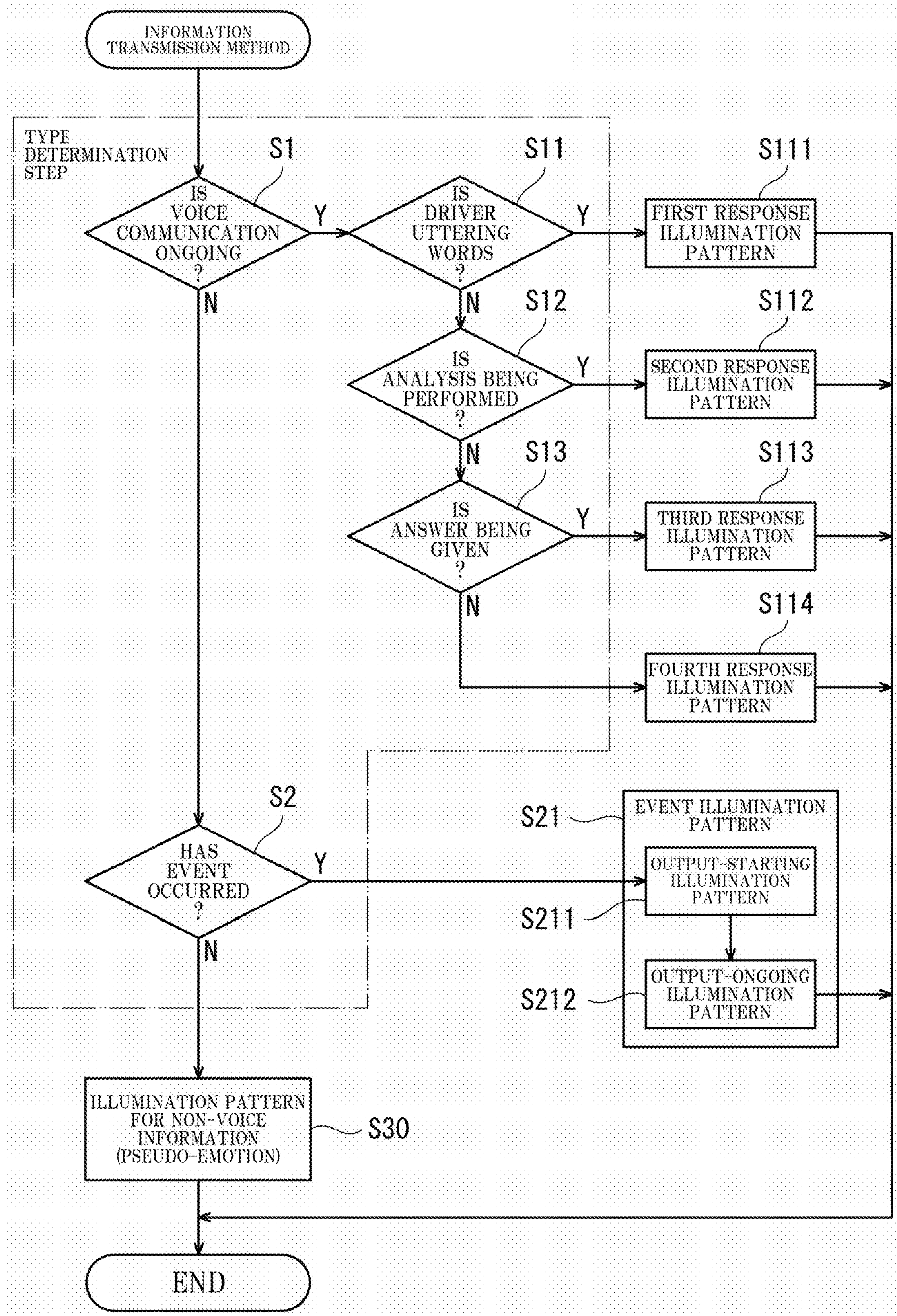
FIG. 3 is a flowchart illustrating an information transmission process executed by the control device.

As shown in FIG. 3, the control device 5 starts the information transmission process once information transmission is enabled, for example, upon powering on of the system (S0). Next, the control device 5 determines whether a voice communication condition is satisfied (S1). The voice communication condition is that, for example, voice communication has been started or is ongoing. In other words, the control device 5 determines whether the type of the information to be transmitted through the display device is the above-described first information type, in particular the "response status".

In some cases, such as when the driver muses aloud, the driver utters words without wanting to have communication, in particular Q&A-form communication, with the vehicle. In order to prevent the voice communication process from taking place in response to such an utterance of the driver, there may be provided a voice communication process condition for permitting the voice communication process to take place. For example, the voice communication process may take place once predetermined specific words are uttered. In an example where such specific words are used, the driver may give a name to the vehicle and register the name in the control device, and the voice communication process may take place once the driver calls the name. The registration of the name may be conducted through the application program as mentioned above. Alternatively, an input operation device such as a physical push button may be provided in the vicinity of the handle, and it may be determined that the voice communication process condition is satisfied once the input operation device is operated. If the voice communication process condition is not satisfied (S1: NO), a determination is made as to whether there is information generated based on an event other than the communication between the driver and the vehicle (S2). In other words, the control device 5 determines whether the information to be transmitted includes the above-described second information type, in particular the "event occurrence status". If the information to be transmitted does not include the second information type (S2: NO), the control device 5 transmits information of the third information type, such as information representing a pseudo-emotion of the vehicle, to the driver through the display device 4 (S30).

In the present embodiment, in step S1, the control device 5 monitors inputs provided from the microphone 3. Upon determining that the driver has uttered the specific words for starting the voice communication process, the control device 5 determines that the condition for the voice communication to start has been satisfied, and maintains this determination for a predetermined period. In other words, the control device 5 determines that the current status is the "response status".

Upon determining that the current status is the response status, the control device 5 determines, based on a signal input from the microphone 3, whether the driver is uttering words (S11). Upon determining that the driver is uttering words (S11; YES), the control device 5 operates the display device 4 to display a first response illumination pattern to indicate that the current status is the utterance information acquiring status where the utterance of the driver is being detected (S111).

Once the driver stops uttering words, the control device 5 enters the analyzing status where the control device 5 interprets the contents of the utterance of the driver to respond to the utterance of the driver. In the analyzing status, the control device 5 searches for appropriate conversation information, analyzes what information should be transmitted in response to the driver's utterance and generates the information to be transmitted. To indicate that the current status is the analyzing status, the control device 5 causes the display device to display a second response illumination pattern (S112).

After generating the information to be transmitted to the driver and ending the analyzing status, the control device 5 causes the sound output device 2 to output the information in the form of sound. To indicate that the current status is the answering status where an answer is being given in the form of sound, the control device 5 causes the display device 4 to display a third response illumination pattern (S113).

When the current status is the response status but not any of the utterance information acquiring status, the analyzing status, and the answering status (S11-S13: NO), the control device determines that the current status is the standby status where questions from the driver are waited for. In the standby status, the vehicle is kept in a standby state where questions (utterances) from the driver are receivable. To indicate that the current status is the standby status, the control device 5 causes the display device 4 to display a fourth response illumination pattern (S114). The control device 5 repeats S11 to S13 described above during a period in which the voice communication condition is satisfied. Upon determining that the current status is not the response status because, for example, a predetermined time has elapsed after making a decision to start the response, the control device 5 stops repeating S11 to S13. The first to fourth response illumination patterns are different from one another. The first to fourth response illumination patterns are not limited to particular ones. For example, the display device 4 is operated to present an illumination pattern of the "collective blinking type" as the first response illumination pattern. For example, the display device 4 is operated to present an illumination pattern of the "inwardly-moving meteor type" as the second response illumination pattern. For example, the display device 4 is operated to present an illumination pattern of the "outwardly-moving meteor type" as the third response illumination pattern. For example, the display device 4 is operated to present, as the fourth response illumination pattern, an illumination pattern of the "collective blinking type" in which the time interval between turning on and off is longer than that in the first response illumination pattern. The fourth response illumination pattern may be of always-on type.

The control device 5 determines whether an event occurrence condition is satisfied (S2). Once the event occurrence condition is satisfied, the control device 5 causes the sound output device 2 to output a sound. To indicate that the current status is an event occurrence status where notification of an event is being provided in the form of sound, the control device 5 causes the display device 4 to present an event occurrence illumination pattern different from those representing the response status (S21).

In the present embodiment, the event occurrence illumination pattern includes an output-starting illumination pattern and an output-ongoing illumination pattern. When the event occurrence condition is satisfied, the control device operates the display device 4 to present the output-starting illumination pattern to indicate that the control device has got ready to cause the sound output device to output a sound, namely that sound output will be started (S211). Next, the control device notifies the driver of the event through sound output by the sound output device 2 and operates the display device to present the output-ongoing illumination pattern to indicate that notification of the event is being provided in the form of sound (S212). The illumination patterns may be varied based on the kind of the event of which the driver should be notified.

For example, the display device 4 is operated to present a rainbow-colored illumination pattern of the "collective blinking type" as the output-starting illumination pattern. Next, an illumination color and an illumination type which are associated with the contents of the information provided in the form of sound are selected as the color and type of the output-ongoing illumination pattern. For example, if the information provided in the form of sound concerns the weather, an illumination pattern of the "inwardly-moving meteor type" which has a purple color representing cloudy sky may be selected when it is raining, and an illumination pattern of the "outwardly-moving meteor type" which has a light blue color representing clear sky may be selected when it is fine.

The control device 5 determines whether a non-voice information illumination condition is satisfied (S30). When the non-voice information illumination condition is satisfied, the color and type of the illumination pattern are selected according to the contents of the information to be transmitted. In the present embodiment, when the current status is not the response status or the event occurrence status, it is determined that the non-voice information illumination condition is satisfied. In the present embodiment, the information to be transmitted by non-voice information illumination is a pseudo-emotion of the vehicle. When a positive pseudo-emotion is expressed, it is conceivable to present a green illumination pattern of the "outwardly-moving meteor type". When a negative pseudo-emotion is expressed, it is conceivable to present a blue or red illumination pattern of the "inwardly-moving meteor type".

As seen from the foregoing description, the method of control executed by the control device 5 includes: a type determination step of determining the type of the information to be transmitted to the driver when the driver is driving the vehicle; a sound output step of outputting the information in the form of sound; and a display step of operating the display device 4 to display an illumination pattern as a function of the type determined in the type determination step. In the present embodiment, the driver can recognize the to-be-received information not only through the auditory sense but through the visual sense, and thus can easily understand the information. For example, in addition to receiving specific information output in the form of sound, the driver can know the status of information transmission and the type of the information. As such, the driver's understanding of the transmitted information can be enhanced. In a conversation between people, for example, when one person auditorily presents specific linguistic information together with additional visual information (e.g., facial expression, complexion, eye direction, and various gestures such as body gestures and hand gestures), the other person can understand the specific linguistic information better than when it is provided alone. In the present embodiment, not only is linguistic information output in the form of sound, but also information relevant to the linguistic information output in the form of sound is displayed on the display device 4. As such, the driver can quickly understand the transmitted information or know the status of the communication with the vehicle. Consequently, the driver can enhance the understanding of the information. A display representing a response status other than the standby status, the utterance information acquiring status, the analyzing status, and the answering status may be presented. For example, when an utterance of the driver is successfully sensed but cannot be recognized or analyzed as sound information, the display device 4 may be operated to present a display representing a request status where the vehicle is requesting the driver to make the utterance again. This allows the driver to further enhance the situational awareness. In the present embodiment, it is not necessary to display all of the standby status, the utterance information acquiring status, the analyzing status, and the answering status. At least one of these statuses may be displayed.

The display device 4 changes the displayed illumination pattern to inform the driver of the response status associated with sound information generated in communication with the driver. In the response status, the display device 4 displays an illumination pattern different from those representing statuses other than the response status. In the present embodiment, the illumination pattern for the response status differs in the color of emitted light from those representing the other statuses. Specifically, the color of emitted light is set to white color for the response status and set to colors other than white for the other statuses. Thus, the driver can know whether the current status is the response status by checking the color of the illumination pattern displayed. As such, during travel, the driver can pay different levels of attention to the sound output device 2 and the display device 4 and enhance the understanding of the information as needed according to the situation. The above-described difference in the illumination pattern displayed by the display device 4 is merely an example. The illumination pattern for the response status and those for the other statuses may be different in a parameter other than the color of emitted light.

In the present embodiment, the illumination pattern displayed by the display device 4 in the response status is changed based on whether the response status is the standby status where questions from the driver are waited for, the analyzing status intermediate between recognizing a question from the driver and giving an answer to the question, or the answering status where the answer to the driver's question is output in the form of sound. Thus, the driver can know whether the control device 5 is in the standby status, the analyzing status, or the answering status. With this knowledge, the driver can change his/her motion for the conversation with the vehicle or change the level of attention paid to the sound output device or display device, thereby enhancing the understanding of the information as needed according to the situation.

In the present embodiment, the information types include the event notification status which is other than the response status and which is associated with information generated based on an event other than communication with the driver. Upon determining that the current status is the event notification status, the control device 5 operates to output event information in the form of sound in the sound output step and controls the illumination pattern displayed by the display device 4 in the the sound output step to indicate that the event information is being provided. In the present embodiment, when the display device 4 should display an illumination pattern representing notification of the event status, the control device 5 controls the display device 4 such that the illumination pattern displayed is different from illumination patterns representing the response status. As such, the driver can know whether the current status is the event notifying status from a display presented by the display device 4. The driver can change the level of attention paid to the sound output device or the display device as appropriate, and enhance the understanding of the information as needed according to the situation.

In the present embodiment, the display device 4 is operated to display the "output-starting illumination pattern" in the event notification status. Thus, before notification of an event is provided in the form of sound, the driver can refer to the "output-starting illumination pattern" of the display device to know that sound output will be started, and can get ready for the sound output by concentrating attention on his/her auditory sense. As such, the driver is unlikely to fail to catch the event notification provided in the form of sound. In the case of the event notification, unlike the case of conversation between the driver and the vehicle, it is difficult for the driver to know when sound output will be provided. When the output-starting illumination pattern is used as in the present embodiment, the event notification in the form of sound can be more effectively transmitted.

Additionally, since the "output-ongoing illumination pattern" is displayed, the driver can know the type of the event notification not only through the auditory sense but through the visual sense, and thus can enhance the understanding of the transmitted information. The illumination patterns displayed by the display device before start of sound output may include those displayed for the response status. In that case, the illumination pattern displayed before a voice answer is given may be made different from the illumination pattern displayed before provision of the event notification. This can further enhance the driver's understanding of the transmitted information.

Pseudo-emotions are difficult to express as linguistic information. Pseudo-emotions expressed by illumination patterns can be easily recognized by the driver. Non-linguistic information displayed by the display device in a status other than the sound output status is not limited to pseudo-emotions; for example, ratings of the comfortability, travel road, or driving operation may be displayed.

In the present embodiment, the display device 4 displays different illumination patterns depending on whether the information to be transmitted is the response status, the event notification status, or a pseudo-emotion; thus, the display device 4 can display different kinds of information for different situations in one display region. As such, size increase of the display device can be prevented unlike the case where different display regions are assigned to different situations. The information displayed by the display device 4 need not be specific information substituting for words (information in one-to-one correspondence with linguistic information). A display may be presented for an information group including the statuses and types of a plurality of pieces of sound information. This can reduce the number of types of illumination patterns and make it easy for the driver to understand the displayed information. For example, a single illumination pattern may be set to indicate the sound output status of the event notification information, although in the present embodiment different illumination patterns are displayed for different linguistic contents of the event notification information.

The side light units 41L and 41R of the display device are located outward of the instrument unit 11 displaying the vehicle state in the vehicle width direction. Thus, information transmission through the display device 4 can be accomplished while reduction in viewability of the instrument unit 11 is prevented. Since the side light units 41L and 41R are supported by existing components such as the mirror stays 13L and 13R, the windshield stay, and the edges of the windshield, any additional member for supporting the display device 4 is not required, and thus the structure of the display device can be simplified.

Additionally, since the display region of each of the side light units 41L and 41R and the front light units 42L and 42R is strip-shaped, the overall display region can be broadened. Thus, the viewability of the display device 4 is high even when the driver directs the centers of the eyes toward the travel road or the instrument unit 11. Additionally, since the display device 4 includes a pair of left and light units, the viewability of the display device 4 is high even when the driver is looking either leftward or rightward.

Additionally, since in the present embodiment the center light unit 43 is disposed in the vicinity of the instrument unit 11, the center light unit 43 often appears in the visual field of the driver, thus enhancing the efficiency of information transmission to the driver. Additionally, since the center light unit 43 displays pseudo-emotions in the form of non-linguistic information, the driver can easily recognize the pseudo-emotions while checking the instrument unit 11. Since the center light unit 43 can vary all of the parameters including the color change, the shape type, and the shape change over time in association with each other depending on the information to be transmitted, the viewability to the driver can be improved even when the size of the display region is small. It is preferable to vary two or more parameters selected from the color change, the shape type, and the shape change over time. Depending on the information to be transmitted, however, one of these parameters may be varied.

While an embodiment of the present invention has been described above, the configuration of the above embodiment is merely an example. Changes, additions, and/or deletions may be made to the above configuration without departing from the scope of the present invention.

For example, the display device 4 may include at least one of the side light units, front light units, and center light unit, although in the above embodiment the display device 4 includes all of these light units. The display device 4 only has to be disposed to be viewable by the driver assuming a driving posture, and the light units may be different from those described above. The illumination patterns described for the above embodiment are merely examples, and the present invention includes a configuration in which other illumination patterns are employed. The display device may be disposed, for example, at an edge (such as a side edge or an upper edge) of a meter visor (shield over the instrument unit), the instrument unit, or the windshield. The display device need not be mounted on the vehicle body, and may be mounted on the helmet. Alternatively, the display device may be a removable device attached to lie within the visual field of the driver driving the vehicle. Alternatively, a projector which projects illumination patterns on a projection surface may be used; in this case, the windshield may serve as the projection surface.

While in the above embodiment the vehicle-mounted controller 5*a* is included in the control device, the present invention is not limited to this configuration. For example, when the communication terminal device 5*b* and the sound output device 2 are electrically connected to the display device and the communication terminal device 5*b* can provide output commands to the display device 4 and the sound output device 2, the communication terminal device 5*b* is defined as the control device. Instead of the communication terminal device 5*b*, a signal transmitter/receiver capable of communication with the server device 5*c* may be mounted on the motorcycle MC. In this case, the communication terminal device 5*b* need not be used. The present invention includes a configuration in which there is no connection to the server device 5*c* and in which the vehicle-mounted controller 5*a* or the communication terminal device 5*b* can generate output commands to be provided to the display device 4 and the sound output device 2. In such a configuration, the vehicle-mounted controller 5*a* or the communication terminal device 5*b* performs the function of the control device. Thus, the present invention includes a stand-alone configuration in which the display device 4 and the sound output device 2 can be controlled without recourse to the server device 5*c*. For example, the control device 5, as broadly defined, may be a communication terminal device with a necessary application program installed therein.

The information transmission system is applicable to vehicles other than the motorcycle MC. The motorcycle MC is a vehicle driven by the driver wearing a helmet, and the driver of the motorcycle MC is likely to sense road noise or engine noise. Thus, the system of the present invention which presents visual information intuitively recognizable by the driver is beneficial when used in the motorcycle MC. In the case of a convertible vehicle or straddle vehicle without any separation between the driver space and the external space, as in the case of the motorcycle MC, the influence of sounds present in the surroundings may make it difficult for the driver to achieve information recognition only based on sound information provided through the sound output device 2. In the above embodiment, information associated with the sound output is displayed by the display device 4, and thus the driver's understanding can be enhanced. Additionally, since information is displayed by the display device 4, a decrease in the driver's information understanding can be prevented even when the volume of information output in the form of sound is reduced or the rate of sound output is increased.

While in the above embodiment it is preferable for the display device to be able to vary the color and amount of emitted light and the period at which the light emission occurs, the display device may be able to vary any one of these parameters. While it is preferable to provide different illumination patterns, the present invention includes a configuration in which information transmission is effected in two ways, namely by operating the display device to present a single illumination pattern and by bringing the display device into a turn-off state.

The sound output device 2 and the microphone 3 may be mounted on the vehicle body. In the case of a vehicle such as a motorcycle in which the driver space where the driver is located is not separated from the external space by any component such as the vehicle body, the driver is exposed to noises coming from the external space. Thus, it is preferable that the sound output device 2 and the microphone 3 be mounted on an entity separate from the vehicle and located closer to the head of the driver than the vehicle.

REFERENCE CHARACTER LIST

MC motorcycle
1 information transmission system
2 sound output device
3 microphone
4 display device
41L, 41R side light unit
5 control device

The invention claimed is:

1. An information transmission method implemented in a vehicle to transmit information to a driver of the vehicle, the vehicle being equipped with a display device disposed to be viewable by the driver assuming a driving posture, the method comprising:
- determining a type of the information to be transmitted to the driver when the driver is driving the vehicle;
- outputting the information in the form of sound; and
- operating the display device to display an illumination pattern as a function of the determined type, wherein
- the type is selected from a plurality of information types including a response status associated with information generated in communication with the driver, and
- the illumination pattern displayed by the display device is varied based on whether the determined type is the response status.

2. The information transmission method according to claim 1, wherein
- the response status includes a standby status where a question from the driver is waited for, an analyzing status intermediate between receiving the question from the driver and giving an answer to the question, and an answering status where the answer to the question is being given, and
- when the determined type is the response status, the illumination pattern displayed by the display device is varied based on whether the response status is the standby status, the analyzing status, or the answering status.

3. The information transmission method according to claim 1, further comprising outputting the information to be transmitted to the driver in the form of sound, wherein
- the type is selected from a plurality of information types including an event notification status associated with information generated based on an event other than communication with the driver,
- when the determine type is the event notification status, event information is output in the form of sound, and
- the illumination pattern displayed by the display device is varied based on whether the determined type is the event notification status.

4. An information transmission system for a motorcycle, comprising:
- a sound output device that outputs sounds;
- a display device mounted on a body of the motorcycle and disposed to be viewable by a driver assuming a driving posture; and
- a control device that controls the sound output device and the display device,
- the control device being configured to:
  - determine a type of information to be transmitted to the driver when the driver is driving the motorcycle;
  - operate the sound output device to output the information to be transmitted; and
  - operate the display device to display an illumination pattern as a function of the determined type, wherein
- the type is selected from a plurality of information types including a response status associated with information generated in communication with the driver, and
- the illumination pattern displayed by the display device is varied based on whether the determined type is the response status.

5. The information transmission system according to claim 4, wherein the display device comprises a side light unit located outward of an instrument unit displaying a state of the motorcycle in a width direction of the motorcycle.

6. The information transmission system according to claim 5, wherein the side light unit comprises a pair of light units located outward of the instrument unit in the width direction of the motorcycle.

7. The information transmission system according to claim 5, wherein the display device changes the illumination pattern by changing at least one of color, blinking rate, and order of turning on.

8. The information transmission system according to claim 4, wherein
- the response status includes a standby status where a question from the driver is waited for, an analyzing status intermediate between receiving the question from the driver and giving an answer to the question, and an answering status where the answer to the question is being given, and
- when the determined type is the response status, the illumination pattern displayed by the display device is varied based on whether the response status is the standby status, the analyzing status, or the answering status.

9. An information transmission method implemented in a vehicle to transmit information to a driver of the vehicle, the vehicle being equipped with a display device disposed to be viewable by the driver assuming a driving posture, the method comprising:
- determining a type of the information to be transmitted to the driver when the driver is driving the vehicle based on a determination between a first information type and a second information type;
- outputting the information in the form of sound; and
- operating the display device to display an illumination pattern as a function of the determined type, wherein
- the first information type is selected from a plurality of information types including a response status associated with information generated in communication with the driver, and the illumination pattern displayed by the display device is varied based on whether the determined type is the response status; and
- the second information type is selected from a plurality of information types including an event notification status associated with information generated based on an event other than communication with the driver, the event includes at least one of nearby traffic information, weather information, route navigation information, traffic information, and warning information indicating that another vehicle is approaching, when the determined type is the event notification status, event information is output in the form of sound, and the illumination pattern displayed by the display device is varied based on whether the determined type is the event notification status.

* * * * *